United States Patent
Sokolihs et al.

(10) Patent No.: US 6,579,025 B1
(45) Date of Patent: Jun. 17, 2003

(54) ROD FOR MOTOR VEHICLES

(75) Inventors: Dirk Sokolihs, Bramsche (DE); Norbert Schmudde, Osnabrück (DE); Herbert Holle, Stemwede (DE)

(73) Assignee: ZF Lemförder Metallwaren Ag (DE)

(*) Notice: Subject to any disclaimer, the term of this patent is extended or adjusted under 35 U.S.C. 154(b) by 0 days.

(21) Appl. No.: 09/623,766

(22) PCT Filed: Apr. 30, 1999

(86) PCT No.: PCT/DE99/01274
§ 371 (c)(1),
(2), (4) Date: Oct. 23, 2000

(87) PCT Pub. No.: WO00/40449
PCT Pub. Date: Jul. 13, 2000

(30) Foreign Application Priority Data

Jan. 7, 1999 (DE) .......................... 199 00 264

(51) Int. Cl.⁷ ............................... B62D 7/20
(52) U.S. Cl. .............. 403/44; 403/46; 280/93.511
(58) Field of Search ............. 280/93.51, 93.511, 280/771; 403/109.1, 109.2, 109.5, 110, 122, 109.4, 377, 378, 379.6, 374.3, 344, 44, 46, 77, 371; 74/579 R, 593, 581, 586; 166/105; 285/357, 356, 391

(56) References Cited

U.S. PATENT DOCUMENTS

| | | | | |
|---|---|---|---|---|
| 373,381 A | * | 11/1887 | Snyder | |
| 599,058 A | * | 2/1898 | Gadd | .......................... 403/77 |
| 2,908,507 A | * | 10/1959 | Blanks et al. | |
| 3,734,547 A | * | 5/1973 | Kojima | ....................... 285/357 |
| 3,938,822 A | * | 2/1976 | Guerriero | .................. 280/95 R |
| 3,989,394 A | * | 11/1976 | Ellis | .............................. 403/46 |
| 4,871,194 A | * | 10/1989 | Kawashima et al. | .......... 285/55 |
| 5,306,095 A | * | 4/1994 | Snitgen et al. | ............... 403/290 |
| 6,074,125 A | * | 6/2000 | Krawczak | ................ 403/374.3 |
| 6,076,840 A | * | 6/2000 | Kincaid et al. | ........ 280/124.107 |
| 6,119,550 A | * | 9/2000 | Engler et al. | .................. 74/588 |

FOREIGN PATENT DOCUMENTS

| | | | | |
|---|---|---|---|---|
| CA | 599235 | * | 6/1960 | .................. 403/46 |
| CH | 60722 | * | 7/1912 | .................. 403/44 |
| DE | 77 32 250 | | 2/1978 | |
| DE | 196 45 726 A1 | | 5/1997 | |
| EP | 0 771 717 A2 | | 5/1997 | |
| IT | 505460 | * | 12/1954 | .................. 403/77 |
| JP | 6016141 | * | 1/1994 | .................. 403/410 |

* cited by examiner

Primary Examiner—Lynne H. Browne
Assistant Examiner—Michael P Ferguson
(74) Attorney, Agent, or Firm—McGlew and TUttle, P.C.

(57) ABSTRACT

A steering tie rod for motor vehicles with a pipe, which is provided with an internal thread in a first direction of rotation on at least one side and is slotted at least in some areas, is presented, into which an adjusting sleeve is screwed at its end, where a ball-and-socket joint housing shaft of a ball-and-socket joint present at the end of the steering tie rod is screwed into the internal thread of the adjusting sleeve, which latter internal thread has a second direction of rotation opposite the first direction of rotation. An axial adjusting movement of the pipe relative to the ball-and-socket joint is made possible by a wrench contact surface made in one piece with the adjusting sleeve. The adjusting sleeve (1) has at least one recessed slot (2) and a collar band (4), which is fixed on the outer jacket surface of the pipe (3) and fixes the components in their position in relation to one another.

17 Claims, 4 Drawing Sheets

ROD FOR MOTOR VEHICLES

FIELD OF THE INVENTION

The present invention pertains to a steering tie rod for motor vehicles with at least one pipe, which is provided with an internal thread in a first direction of rotation on at least one side, is slotted in at least some areas, and into which an adjusting sleeve is screwed at the end, wherein a ball-and-socket joint housing shaft of a ball-and-socket joint present at the end of the steering tie rod is screwed into the adjusting sleeve via an internal thread whose direction of rotation is opposite the first direction of rotation, and an axial adjusting movement of the pipe relative to the ball-and-socket joint is made possible by a wrench contact surface made in one piece with the adjusting sleeve.

BACKGROUND OF THE INVENTION

Such steering tie rods are used in motor vehicles especially for the steerable front wheels. As a consequence of fastening on the underside of the vehicle, they are greatly exposed to contamination and weather effects. Prior-art designs of steering tie rods for motor vehicles usually comprise a pipe in the end area of which at least one internal thread is provided. Furthermore, a slotting of the pipe end is frequently provided in this threaded area. A ball-and-socket joint housing shaft, which is made in one piece with the housing of a ball-and-socket joint, is screwed into the pipe end in the prior-art designs.

However, embodiments in which an adjusting sleeve provided with external threads is screwed into the internal threads of the pipe end have been known as well. The adjusting sleeve has in turn an internal thread, in which the ball-and-socket joint housing shaft is then received via a thread. One of the threads provided in the adjusting sleeve is a left-handed thread and the other is a right-handed thread. To make possible a movement of the components in relation to one another by rotating the adjusting sleeve, a wrench contact surface is made in one piece on the outside of the adjusting sleeve. As a consequence of the opposite threads of the adjusting sleeve, the pipe and the ball-and-socket joint are moved toward or away from each other during a twisting of the adjusting sleeve, as a result of which an axial adjusting movement of the components can be achieved.

Furthermore, steering tie rods for motor vehicles have been known, which have an adjusting sleeve, in which one or more slots are provided on one side. This leads to a number of drawbacks. If, e.g., the slot is provided on the side of the adjusting sleeve on which the wrench contact surface is made in one piece with it, the adjusting sleeve undergoes an unduly great deformation during the rotating movement. The adjusting sleeve may be destroyed in extreme cases. Moreover, there is a risk that the slots in the pipe and the slots in the adjusting sleeve will overlap, so that the penetration of water and dirt into the interior of the steering tie rod becomes possible. Failure of the entire assembly unit is ultimately to be feared due to the resulting corrosion in the interior space of the steering tie rod, which must be ruled out in such safety components.

SUMMARY AND OBJECTS OF THE INVENTION

The basic technical object of the present invention is to develop a steering tie rod for motor vehicles in which the penetration of water and contaminants is effectively prevented from occurring. In addition, a constant and uniform fixation of the ball-and-socket joint in the tubular shaft shall be achieved.

According to the invention, a steering tie rod for motor vehicles is provided with at least one pipe, which is provided with an internal thread in a first direction of rotation on at least one side, is slotted in at least some areas, and into which an adjusting sleeve is screwed at the end. A ball-and-socket joint housing shaft of a ball-and-socket joint is present at the end of the steering tie rod and is screwed into the adjusting sleeve via an internal thread whose direction of rotation is opposite the first direction of rotation. An axial adjusting movement of the pipe relative to the ball-and-socket joint is made possible by a wrench contact surface made in one piece with the adjusting sleeve. The adjusting sleeve has at least one recessed slot and a collar band fixed on the outer jacket surface, which fixes the components in their positions relative to one another.

As a result of the recessed slot provided in the adjusting sleeve in a steering tie rod according to the present invention, the wrench contact surface is a surface that is closed in itself, so that deformations during the adjusting movement of the adjusting sleeve are effectively prevented from occurring.

The preparation of a recessed slot in the adjusting sleeve has, furthermore, the advantage that, on the whole, an increase in the dimensional stability of the adjusting sleeve and consequently of the entire steering tie rod assembly unit is achieved.

A collar band or another, suitable clamping means is placed on the outer jacket surface of the pipe receiving the adjusting sleeve for fastening the components in relation to one another.

Furthermore, it is possible to design the adjusting sleeve in the manner of an adapter. This means that uniform pipe diameters and uniform ball-and-socket joint housing shaft diameters can be used for steering tie rods according to the present invention. The difference in the dimensions is compensated by means of the adjusting sleeve. It was possible to create a modular system.

Provisions are made in another advantageous embodiment of the present invention for the recessed slots to be prepared extending predominantly axially or spirally in the adjusting sleeve. In addition, the recessed slots may form, when viewed as being projected onto the geometric center line of the adjusting sleeve, an acute angle with this center line or they may extend in a mutually crossing arrangement.

Other arrangements of the recessed slots are conceivable. It is sufficient according to the present invention for preparing a single recessed slot in the adjusting sleeve. However, it is, of course, also possible to provide a plurality of recessed slots. It is possible, e.g., according to the present invention to prepare in the adjusting sleeve two recessed slots arranged diagonally opposite one another or three recessed slots arranged offset by 120° in relation to one another.

A T-shaped geometry of the recessed slots is also within the scope of the idea of the present invention. It should be noted in this connection that both the mutually crossing arrangement of the recessed slots and the T shape of the recessed slots generate elastic areas in the adjusting sleeve, so that an optimal tensioning of the components by the collar band is made possible. To impart sufficient stability to the entire steering tie rod assembly unit, the width of the recessed slots should not exceed 2 to 6 mm. A slot width of 4 mm is especially advantageous. The longitudinal extension of the recessed slots may vary as well. However, it should be between one half and two thirds of the overall length of the adjusting sleeve according to the present invention.

Since the steering tie rod is massively exposed to splash water and other contaminants in the area of the motor vehicle close to the wheel, it is, furthermore, advantageous to provide the steering tie rod and especially the adjusting sleeve with a surface protection. This may consist of a zinc-iron coating in the known manner.

Preferred exemplary embodiments of the solution according to the present invention will be explained in greater detail below with reference to the corresponding drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiment of the invention are illustrated.

DESCRIPTION OF THE PREFERRED EMBODIMENTS

Figure 1:
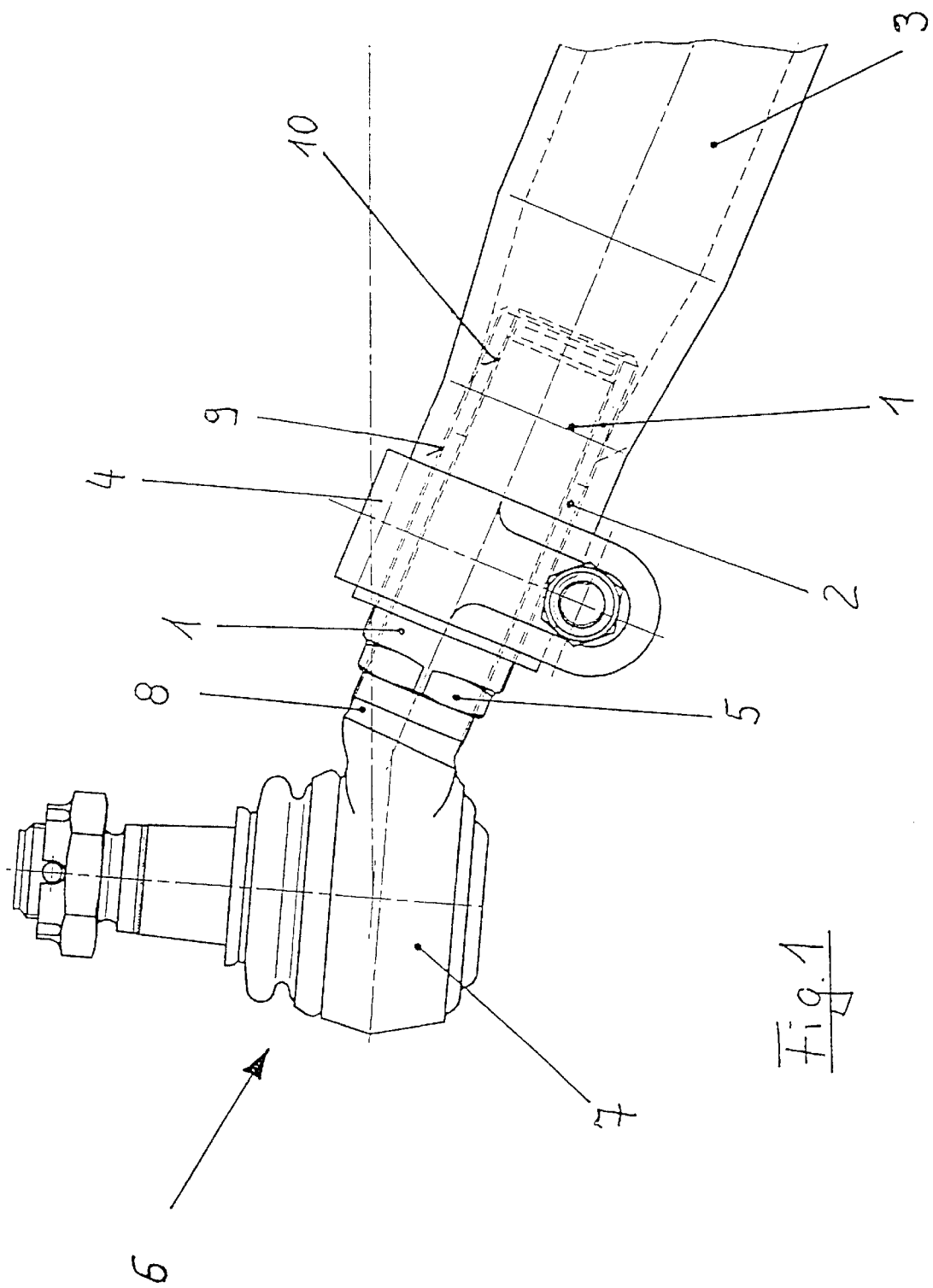
FIG. 1 is a detailed view of the end piece of a steering tie rod according to the present invention.

Referring to the drawings in particular, FIG. 1 shows a detail of an embodiment of a steering tie rod according to the present invention for motor vehicles. The end of the pipe 3, which end is contracted, i.e., has a reduced diameter, has a first internal thread 9. An adjusting sleeve 1 has an external thread 12 which is screwed into this internal thread. The adjusting sleeve itself has an internal thread 10. The ball-and-socket joint housing shaft 8 of a ball-and-socket joint 6 is inserted into this second internal thread 10. The ball-and-socket joint housing shaft is made in one piece with the ball-and-socket joint housing 7 of the above-mentioned ball-and-socket joint 6. The first internal thread 9 and the second internal thread are opposite each other. Furthermore, a wrench contact surface 5 is made in one piece with the outer end of the adjusting sleeve 1, which end is not screwed in. A tool, e.g., an open-jawed wrench, can be attached to this wrench contact surface 5 in order to rotate the adjusting sleeve. As a consequence of the opposite threads 9 and 10, a twisting movement of the adjusting sleeve 1 causes the pipe 3 and the ball-and-socket joint 6 to move toward or away each other. The components are secured by means of a collar band 4 against spontaneous movement when the necessary setting has been reached.

Figure 2:
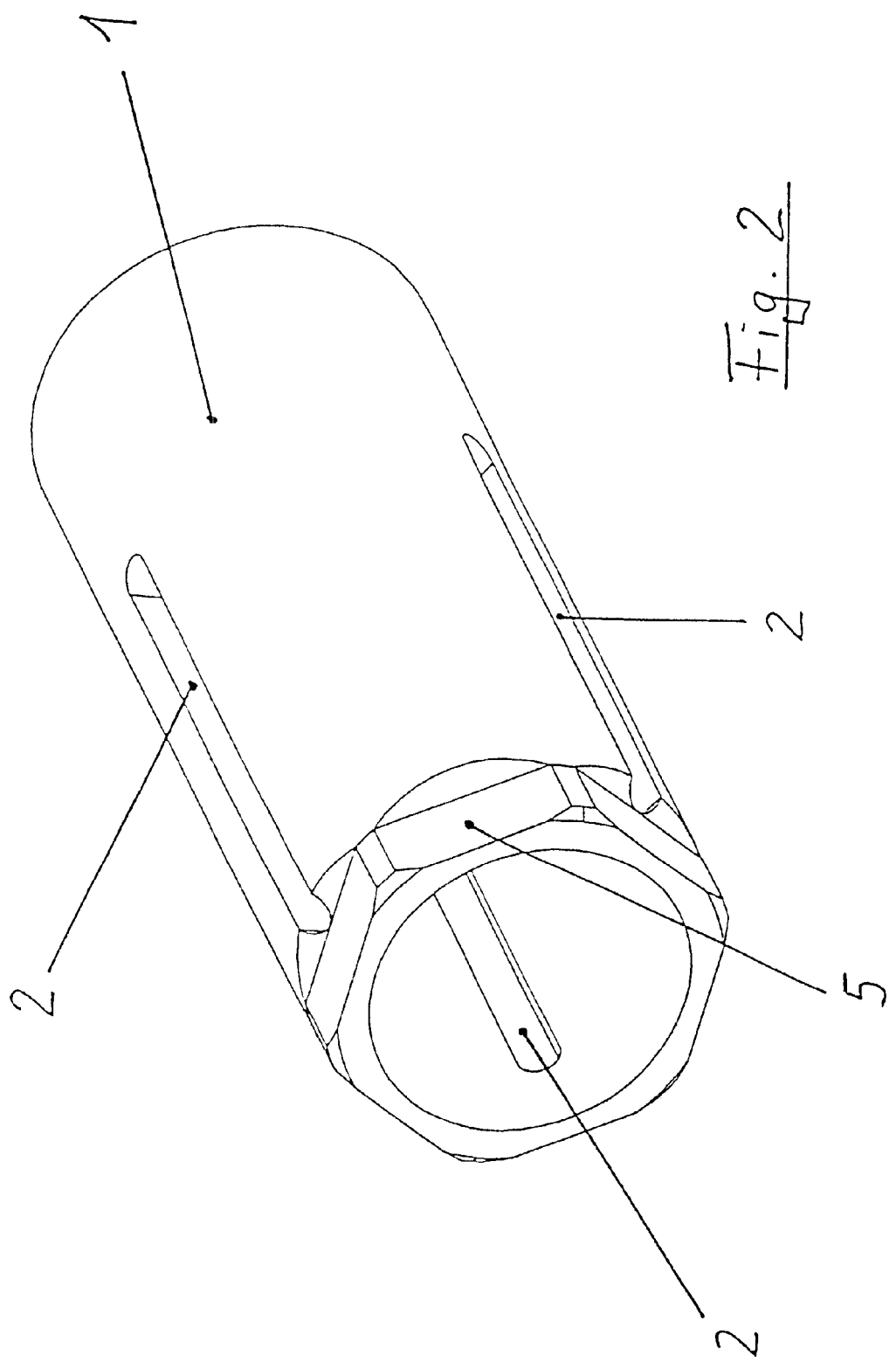
FIG. 2 is a perspective view of a first possible embodiment of an adjusting sleeve according to the invention.
Figure 3:
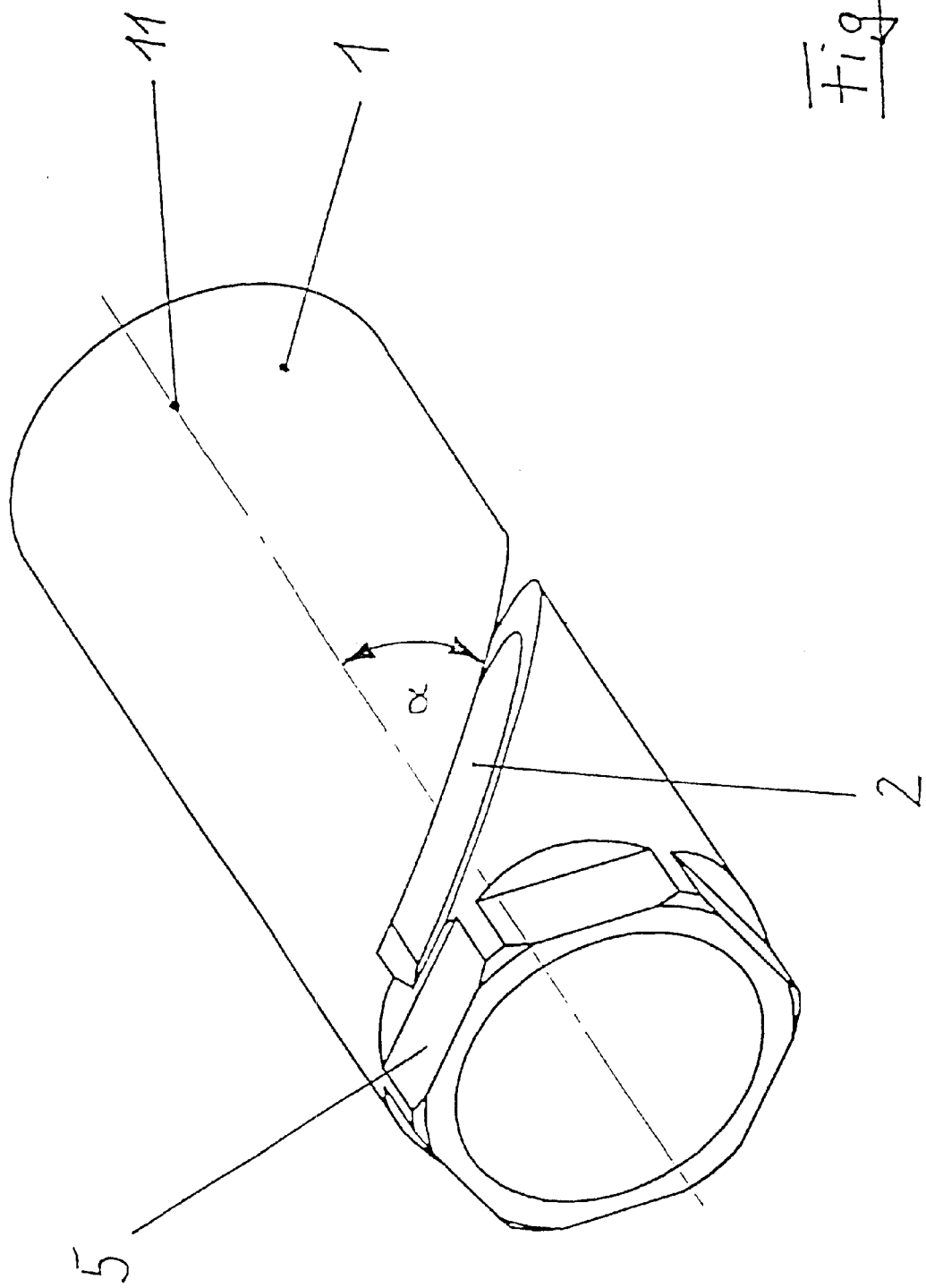
FIG. 3 is a perspective view of a second possible embodiment of an adjusting sleeve according to the present invention.
Figure 4:
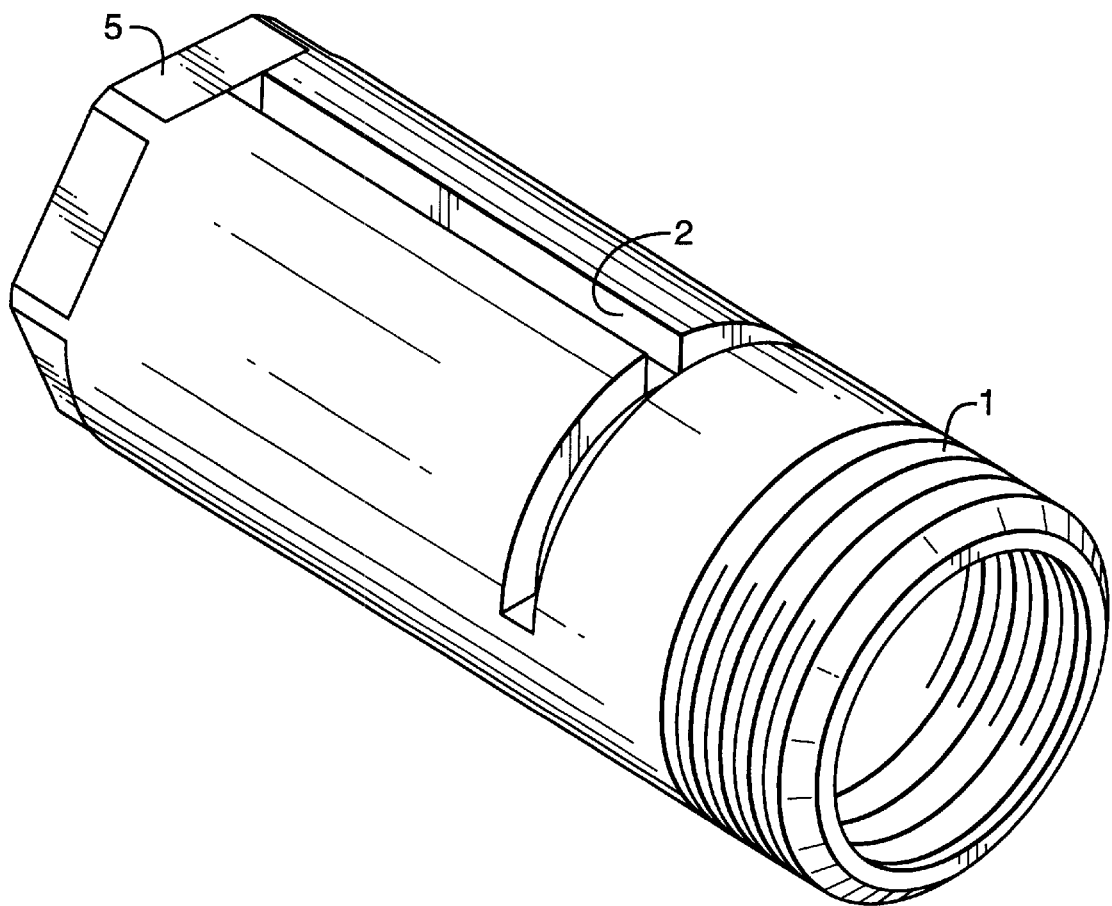
FIG. 4 is a perspective view of a third possible embodiment of an adjusting sleeve according to the present invention.

FIGS. 2 and 3 show two exemplary embodiments of an adjusting sleeve according to the present invention. These adjusting sleeves 1 each have a recessed slot 2 and a wrench contact surface 5 made in one piece with it. The adjusting sleeves 1 are of an identical design up to this point. Contrary to the adjusting sleeve shown in FIG. 2, in which three recessed slots off set by 120° in relation to one another are provided, the adjusting sleeve 1 according to FIG. 3 has a recessed slot called a diagonal slot 2. Projected to the center line 11 of the adjusting sleeve 1, the recessed slot 2 forms an acute angle with the center line 11. This is designed by "α" in FIG. 3. The recessed slots 2 can also be arranged to have a T shape as shown in FIG. 4.

A very stable assembly unit, which makes it, moreover, possible to finely adjust the wheel gauge on the motor vehicle, is produced by a design of a steering tie rod according to the present invention for motor vehicles. The slots in the pipe 3 and in the recessed slot or the recessed slots can be effectively prevented from being located one over another in a steering tie rod according to the present invention by the recessed slots being provided exclusively in areas that are located outside the slots of the pipe. Water or contaminants are thus effectively prevented from penetrating into the steering tie rod and premature corrosion and aging of the entire assembly unit are thus prevented.

While specific embodiments of the invention have been shown and described in detail to illustrate the application of the principles of the invention, it will be understood that the invention may be embodied otherwise without departing from such principles.

What is claimed is:

1. A steering tie rod for motor vehicles, the tie rod comprising:

a pipe having an internal thread in a first direction of rotation on an end, said pipe being slotted in at least some areas;

an adjusting sleeve screwed into said pipe at said end, said adjusting sleeve including an internal thread whose direction of rotation is opposite the first direction of rotation, said adjusting sleeve having a wrench contact surface made in one piece with the adjusting sleeve, said adjusting sleeve having at least one recessed slot not extending into said wrench contact surface, said wrench contact surface extending completely around said adjusting sleeve, wherein said recessed slot is spaced from both ends of said adjusting sleeve.

a ball-and-socket joint with a ball-and-socket joint housing shaft screwed into the adjusting sleeve to make possible an axial adjusting movement of the pipe relative to the ball-and-socket joint by said wrench contact surface; and a collar band fixed on an outer jacket surface of said pipe for fixing said pipe and adjusting sleeve in positions relative to one another.

2. A steering tie rod for motor vehicles in accordance with claim 1, wherein said recessed slot is preformed in said adjusting sleeve extending predominantly axially;

said recessed slot is limited to being completely within said adjusting sleeve.

3. A steering tie rod for motor vehicles in accordance with claim 1, wherein said recessed slot is preformed in said adjusting sleeve extending predominantly helically;

said recessed slot is spaced from ends and sides of said adjusting sleeve.

4. A steering tie rod for motor vehicles in accordance with claim 1, wherein plural recessed slots are preformed in said adjusting sleeve extending predominantly helically and projected to a geometric center line of said adjusting sleeve, form an acute angle with said geometric center line or extend in a mutually crossing arrangement.

5. A steering tie rod for motor vehicles in accordance with claim 1, wherein two recessed slots are arranged diametrically opposed to one another formed on said adjusting sleeve.

6. A steering tie rod for motor vehicles in accordance with claim 1, wherein three recessed slots are arranged offset by 120° in relation to one another formed on said adjusting sleeve.

7. A steering tie rod for motor vehicles in accordance with claim 1, wherein said recessed slot has approximately a T shape.

8. A steering tie rod for motor vehicles in accordance with claim 1, wherein said recessed slot has a width between 2 and 6 mm.

9. A steering tie rod for motor vehicles in accordance with claim 1, wherein said recessed slot has a width of approximately 4 mm.

10. A steering tie rod for motor vehicles in accordance with claim 1, wherein said recessed slot extends over a length of said adjusting sleeve that approximately corresponds to ½ to ⅔ of the overall length of said adjusting sleeve.

11. A steering tie rod for motor vehicles in accordance with claim 1, wherein said adjusting sleeve is provided with surface protection.

12. A steering tie rod for motor vehicles in accordance with claim 1, wherein said surface protection is an electroplated zinc-iron coating.

13. A tie rod in accordance with claim 1, wherein:
said adjusting sleeve has a wrench portion having said wrench contact surface, said wrench portion extends completely circumferentially around said adjusting sleeve;
said wrench portion is arranged at one end of said sleeve;
said recessed slot of said sleeve is completely arranged within said adjusting sleeve and contained between ends of said adjusting sleeve.

14. A tie rod comprising:
a pipe having an end with an internal thread in a first direction of rotation, said end defining a pipe slot, said pipe including an outer surface;
an adjusting sleeve screwed into said pipe at said end of said pipe, said adjusting sleeve including an internal thread whose direction of rotation is opposite said first direction of rotation, said adjusting sleeve having a wrench portion extending completely around said adjusting sleeve, said adjusting sleeve defining a sleeve slot, wherein said sleeve slot is spaced form both ends of said adjusting sleeve;
a ball-and-socket joint with a shaft screwed into said adjusting sleeve, said adjusting sleeve being axially adjustable of said pipe relative to said ball-and-socket joint by rotation applied to said wrench portion of said adjusting sleeve; and
a clamp arranged on said outer surface of said pipe for fixing said pipe and adjusting sleeve relative to one another.

15. A tie rod in accordance with claim 14, wherein:
said wrench portion has a wrench contact surface;
said sleeve slot is limited to being completely within said adjusting sleeve.

16. A tie rod in accordance with claim 14, wherein;
said sleeve slot does not extend into said wrench portion.

17. A tie rod in accordance with claim 14, wherein:
said wrench portion is arranged at one end of said sleeve.

* * * * *